(12) United States Patent
O'Dwyer et al.

(10) Patent No.: US 6,590,049 B1
(45) Date of Patent: Jul. 8, 2003

(54) MULTI-FUNCTIONAL INITIATORS FOR ATOM TRANSFER RADICAL (CO)POLYMERIZATION

(75) Inventors: James B. O'Dwyer, Valencia, PA (US); Kevin C. Olson, Gibsonia, PA (US); Simion Coca, Pittsburgh, PA (US); Brian E. Woodworth, Mars, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 87 days.

(21) Appl. No.: 09/687,026

(22) Filed: Oct. 13, 2000

Related U.S. Application Data

(63) Continuation-in-part of application No. 09/464,947, filed on Dec. 16, 1999, now Pat. No. 6,326,420.

(51) Int. Cl.$^7$ .................................................. C08F 2/00
(52) U.S. Cl. ..................... 526/206; 526/222; 526/234; 526/307.1; 526/319; 526/329.7; 526/209
(58) Field of Search ............................. 526/206, 222, 526/234, 307.1, 319, 209, 329.7

(56) References Cited

U.S. PATENT DOCUMENTS

| | | | | |
|---|---|---|---|---|
| 4,508,880 A | * | 4/1985 | Webster | ...................... 526/190 |
| 4,656,226 A | * | 4/1987 | Hutchins et al. | ............... 525/93 |
| 5,763,548 A | | 6/1998 | Matyjaszewski et al. | |
| 5,789,487 A | | 8/1998 | Matyjaszewski et al. | |
| 5,807,937 A | | 9/1998 | Matyjaszewski et al. | |
| 5,986,015 A | * | 11/1999 | Midha et al. | ............ 525/331.4 |
| 6,162,882 A | | 12/2000 | Matyjaszewski et al. | |
| 6,326,420 B1 | * | 12/2001 | Olson et al. | ................ 523/334 |

FOREIGN PATENT DOCUMENTS

| | | | | |
|---|---|---|---|---|
| WO | WO 97/18247 | 5/1997 | ............. | C08F/4/40 |
| WO | WO 98/40415 | 9/1998 | ............. | C08F/4/10 |

OTHER PUBLICATIONS

Heise, Andreas et al., *Starlike Polymeric Architectures by Atom Transfer Radical Polymerization: Templates for the Production of Low Dielectric Constant Thin Films*, Macromolecules 2000, pp. 2346–2354.

\* cited by examiner

*Primary Examiner*—Tatyana Zalukaeva
(74) *Attorney, Agent, or Firm*—William J. Uhl

(57) ABSTRACT

The present invention is directed to novel compounds that can serve as highly efficient initiators for controlled radical (co)polymerization processes including atom transfer radical (co)polymerization processes. These compounds include di-(trimethylolpropane)-tetra-(2-haloisobutyrate) compounds. The present invention also is directed to controlled radical (co)polymerization processes in which novel (co)polymers are prepared using the novel compounds, as well as to the novel (co)polymer products of the process.

19 Claims, No Drawings

MULTI-FUNCTIONAL INITIATORS FOR ATOM TRANSFER RADICAL (CO)POLYMERIZATION

This application is a continuation-in-part of U.S. application Ser. No. 09/464,947, filed Dec. 16, 1999, now U.S. Pat. No. 6,326,420.

FIELD OF THE INVENTION

The present invention relates to a (co)polymer prepared with novel initiators in a controlled radical (co)polymerization process, as well as a novel controlled radical (co)polymerization process that utilizes the novel initiators.

BACKGROUND OF THE INVENTION

A wide variety of radically polymerizable monomers, such as methacrylate and acrylate monomers, are commercially available and can confer to a polymer or copolymer (hereinafter, collectively referred to as (co)polymer) produced therefrom a wide range of properties including, for example, hydrophilic and hydrophobic properties or the ability to interact with crosslinkers or to self crosslink. The use of conventional, i.e., non-living or free-radical (co)polymerization methods to synthesize (co)polymers provides little control over molecular weight, molecular weight distribution and, in particular, (co)polymer chain structure.

U.S. Pat. No. 5,807,937, 5,789,487, 5,763,548, and International Patent Publication Nos. WO 98/40415, WO 98/01480, WO 97/18247 and WO 96/30421 describe a radical polymerization process referred to as atom transfer radical polymerization (ATRP). The ATRP process is described as being a living radical polymerization that results in the formation of polymers having predictable molecular weight and molecular weight distribution. The ATRP process also is described as providing highly uniform products having controlled structure (i.e., controllable topology, composition, etc.). The 5,807,937 and 5,763,548 patents also describe (co)polymers prepared by ATRP, which are useful in a wide variety of applications including, for example, dispersants and surfactants.

A number of initiators and macroinitiator sytems are known to support ATRP polymerization. These initiators are described, for example, in U.S. Pat. Nos. 5,807,937 and 5,986,015. U.S. Pat. No. 5,807,937 discloses a number of initiators, including halide groups attached to a primary carbon. Halides attached to primary carbons are known as efficient initiators in ATRP processes. U.S. Pat. No. 5,986,015 discloses polymer macroinitiators prepared from vinyl chloride and another monomer, and their use in preparing graft (co)polymers with low polydispersity.

Described in Heise, Andreas, et al., ("Starlike polymeric Architectures by Atom Transfer Radical Polymerization: Templates for the Production of Low Dielectric Constant Thin Films," *Macromolecules*, (2000) 33:2346–2354) are starlike dedrimeric polymers prepared by an ATRP process. The polymers are useful in the production of semiconductor devices. The polymers are initiated with a polyfunctional initiator prepared by reacting an aromatic group-containing alcohol, diol or polyol with an esterified trimer of 2-bromo-2-methylpropionyl bromide. The initiator contains aromatic moieties as well as a large number of ester linkages. The presence of aromatic moities renders the resultant polymer susceptible to UV degradation. The ester linkages are susceptible to hydrolysis under acidic conditions (i.e. acid rain). It is therefore an object of the present invention to provide a polyfunctional initiator for a controlled radical polymerization process that has minimal aromatic content and reduced number of ester content with reduced susceptibility to UV degradation and acid hydrolysis.

It also is desirable to have multiple initiation sites on an initiator in order to create unique branched (co)polymer structures, such as star (co)polymers. Such (co)polymers have a variety of practical applications, including as a resin component of a film-forming coating composition. These unique (co)polymers also will find use in the health care or cosmetics industries for instance, as materials for bioengineering. (Co)polymers of low polydispersity (Mn/Mw) are also desirable not only for their structural regularity and related usefulness in producing defined block and multi-block (co)polymer structures, but for their unique physical characteristics. For instance, a star (co)polymer having low polydispersity is a high molecular eight material having low viscosity in solution.

It is therefore desired to have a polyfunctional (two or more initiator sites) ATRP initiator where each initiator site has the same or very similar initiation efficiency ($K_i$) as the other initiator sites. It is also desirable that the initiators can be easily prepared from inexpensive and readily available compounds.

SUMMARY OF THE INVENTION

In accordance with the present invention, there is provided a novel ether or sulfide group-containing polyfunctional initiator for controlled radical (co)polymerization that includes two or more initiation sites. The initiator includes two or more halide group-containing initiation sites that are connected by substantially aliphatic groups and having the structure $R-[L-I]_n$: in which, a) n is an integer greater than 1; b) R is an organic n-valent linking group containing at least one ether or sulfide linkage; c) L is optionally present for each instance of I and is a divalent polyether or polysulfide segment; and d) I is a group having the formula:

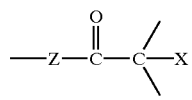

in which X is a halide, which may be the same or different for each instance of I and Z is either oxygen or sulfer.

Preferably, I is a group having the formula:

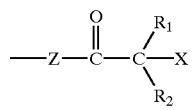

in which $R_1$ and $R_2$ are independently the same or different hydrogen, $C_{1-20}$ alkyl, $C_{1-20}$ substituted alkyl, $C_{1-20}$ alkenyl, $C_{3-8}$ cycloalkyl, heterocyclyl or aryl groups. For each instance of 1, each instance of X, $R_1$ or $R_2$ may be the same or different. The initiator is most preferably di-(trimethylolpropane)-tetra-(2-haloisobutyrate).

The present invention also is directed to a controlled radical polymerization process that utilizes the above-described high efficiency initiators to produce novel linear or branched, including star-shaped (co)polymeric compositions having low polydispersity. Lastly, the present invention is directed to (co)polymeric compositions prepared according to this process.

DETAILED DESCRIPTION OF THE PREFERRED EMBODIMENTS

Other than in the operating examples, or where otherwise indicated, all numbers or expressions referring to quantities of ingredients, reaction conditions, etc, used in the specification and claims are to be understood as modified in all instances by the term "about".

The (co)polymer of the present invention is prepared by controlled radical polymerization. As used herein and in the claims, the term "controlled radical polymerization," and related terms, e.g., "living radical polymerization," refer to those methods of radical (co)polymerization that provide control over the molecular weight, molecular weight distribution, polydispersity and (co)polymer chain architecture. A controlled or living radical (co)polymerization is also described as a chain-growth (co)polymerization that propagates with essentially no chain transfer and essentially no chain termination. The number of living (co)polymer chains formed during a controlled radical (co)polymerization is often nearly equal to the number of initiators present at the beginning of the reaction. Each living (co)polymer chain typically contains a residue of the initiator at what is commonly referred to as its tail, and a residue of the radically transferable group at what is commonly referred to as its head.

In an embodiment of the present invention, the (co)polymer is prepared by atom transfer radical polymerization (ATRP). The ATRP process comprises: (co)polymerizing one or more radically polymerizable monomers in the presence of a specific initiation system; forming a (co)polymer; and isolating the formed (co)polymer. In the present invention, the initiation system comprises: a monomeric initiator having multiple radically transferable atoms or groups; a transition metal compound, i.e., a catalyst, which participates in a reversible redox cycle with the initiator; and a ligand, which coordinates with the transition metal compound. The ATRP process is described in further detail in International Patent Publication WO 98/40415 and U.S. Pat. Nos. 5,807,937, 5,763,548 and 5,789,487.

Catalysts that may be used in the ATRP preparation of the (co)polymer of the present invention, include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following formula (I), $$TM^{n+}X_n \tag{I}$$

wherein TM is the transition metal, n is the formal charge on the transition metal having a value of from 0 to 7, and X is a counterion or covalently bonded component. Examples of the transition metal include, but are not limited to, Cu, Fe, Au, Ag, Hg, Pd, Pt, Co, Mn, Ru, Mo, Nb and Zn. Examples of X include, but are not limited to, halide, hydroxy, oxygen, $C_1$–$C_6$-alkoxy, cyano, cyanato, thiocyanato and azido. A preferred transition metal is Cu(I) and X is preferably halide, e.g., chloride. Accordingly, a preferred class of transition metal catalysts are the copper halides, e.g., Cu(I)Cl. It is also preferred that the transition metal catalyst contain a small amount, e.g., 1 mole percent, of a redox conjugate, for example, Cu(II)$Cl_2$ when Cu(I)Cl is used. Additional catalysts useful in preparing the (co)polymer are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in the ATRP preparation of the (co)polymer, include, but are not limited to compounds having one or more nitrogen, oxygen, phosphorus and/or sulfur atoms, which can coordinate to the transition metal catalyst compound, e.g., through sigma and/or pi bonds. Classes of useful ligands, include but are not limited to: unsubstituted and substituted pyridines and bipyridines; porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl (meth)acrylates. As used herein and in the claims, the term "(meth)acrylate" and similar terms refer to acrylates, methacrylates, and mixtures of acrylates and methacrylates. A preferred class of ligands are the substituted bipyridines, e.g., 4,4'-dialkyl-bipyridyls. Additional ligands that may be used in preparing the (co)polymer are described in U.S. Pat. No. 5,807,937 at column 18, line 57 through column 21, line 43.

The initiator includes two or more halide-containing initiation sites that are primarily connected by aliphatic carbons. The connecting aliphatic carbons may include aromatic residues. However, to avoid susceptibility to UV degradation, aromatic moeities are generally avoided. The avoidance of aromatic moieties also isolates each. Typically the connecting carbons are aliphatic (free from aromatic moieties). The initiator sites are also preferably "symmetrical". By "symmetrical" it is meant that the $K_i$ (initiation constant) for each initiation site and typically the $K_p$ (propogation constant) is substantially the same. By "isolated" it is meant that the $K_i$ and $K_p$ for each initiation site is not affected substantially by the initiation and propagation of (co)polymerization on a second initiation site on the same initiator.

The initiator typically has the structure R—[L—I]$_n$ in which: a) n is an integer greater than 1; b) R is an organic n-valent linking group containing at least one ether or sulfide linkage; c) L is optionally present for each instance of I and is a divalent polyether or polysulfide segment, each instance of which may be the same or different; and d) I is a group having a group of the general structure II:

(II)

in which X is a halide, preferably bromide, which may be the same or different for each instance of I and Z is either oxygen or sulfer.

Preferably, I is a group having the structure III:

(III)

which X and Z are defined as above, $R_1$ and $R_2$ are independently the same or different hydrogen, straight or branched alkyl of 1 to 20 carbon atoms (including methyl, preferably from 2 to 6 carbon atoms, more preferably from 2 to 4 carbon atoms), unsaturated straight or branched alkenyl or alkynyl of 2 to 10 carbon atoms (preferably from 2 to 6 carbon atoms, more preferably from 2 to 4 carbon atoms), $C_3$–$C_8$ cycloalkyl (including cyclohexyl), aryl or heterocyclyl.

The term "aryl" refers to phenyl, naphthyl, phenanthryl, phenalenyl, anthracenyl, triphenylenyl, fluoranthenyl, pyrenyl, pentacenyl, chrysenyl, naphthacenyl, hexaphenyl, picenyl and perylenyl (preferably phenyl and naphthyl), in which each hydrogen atom may be replaced with alkyl of from 1 to 20 carbon atoms (preferably from 1 to 6 carbon atoms and more preferably methyl), alkyl of from 1 to 20 carbon atoms (preferably from 1 to 6 carbon atoms and more preferably methyl) in which each of the hydrogen atoms is independently replaced by a halide (preferably a fluoride or a chloride), alkenyl of from 2 to 20 carbon atoms, alkynyl of from 1 to 20 carbon atoms, alkoxy of from 1 to 6 carbon atoms, alkylthio of from 1 to 6 carbon atoms, $C_3$–$C_8$ cycloalkyl, phenyl, halogen, $NH_2$, $C_1$–$C_6$-alkylamino, $C_1$–$C_6$-dialkylamino, and phenyl which may be substituted with from 1 to 5 halogen atoms and/or $C_1$–$C_4$ alkyl groups.

The term "heterocyclyl" refers to pyridyl, furyl, pyrrolyl, thienyl, imidazolyl, pyrazolyl, pyrazinyl, pyrimidinyl, pyridazinyl, pyranyl, indolyl, isoindolyl, indazolyl, benzofuryl, isobenzofuryl, benzothienyl, isobenzothienyl, chromenyl, xanthenyl, purinyl, pteridinyl, quinolyl, isoquinolyl, phthalazinyl, quinazolinyl, quinoxalinyl, naphthyridinyl, phenoxathiinyl, carbazolyl, cinnolinyl, phenanthridinyl, acridinyl, 1,10-phenanthrolinyl, phenazinyl, phenoxazinyl, phenothiazinyl, oxazolyl, thiazolyl, isoxazolyl, isothiazolyl, and hydrogenated forms thereof known to those in the art. Preferred heterocyclyl groups include pyridyl, furyl, pyrrolyl, thienyl, imidazolyl, pyrazolyl, pyrazinyl, pyrimidinyl, pyridazinyl, pyranyl and indolyl, the most preferred heterocyclyl group being pyridyl.

For each instance of 1, each instance of X, Z, $R_1$ or $R_2$ may be the same or different. R can be divalent (n=2), preferably resulting in a linear block (co)polymer. If n>2, the typical (co)polymer produced therefrom is a star or networked (co)polymer.

An example of the initiator of the present invention is di-(trimethylolpropane)-tetra-(2-haloisobutyrate), which includes halo-isobutyryl groups. The halide groups preferably are bromides. This polyfunctional haloisobutyrate is the reaction product of a polyol, such as di-(trimethylolpropane) (di-TMP), commercially available from Perstorp Specialty Chemicals of Toledo, Ohio, and a stoichiometric quantity of a 2-haloisobutyryl halide, such as 2-bromoisobutyryl bromide (2-bromo-2-methylpropionyl bromide).

The n-valent organic linking group can be a linear, branched or cyclic, primarily aliphatic group having a theoretically unlimited molecular weight and degree of branching and cyclization. The linking group may contain one or more aromatic moieties, so long as the isolation of the initiation sites are not affected by the presence of the aromatic moieties. Depending upon the method by which the initiator is formed, the linking group may contain one or more hetero atoms in addition to the 0 of the ether linkage or S of the sulfide linkage. For example, and without limitation, N, S, O, P, Si or halogen, or groups comprising these atoms, such as, without limitation, ester, ether, sulfide, urethane, urea, amide, silyl, siloxyl, sulfonate and phosphate ester groups.

Examples of the polyether or polysulfide segment L are polyalkylene ether polyols or polysufides that include those having the following general formula IV:

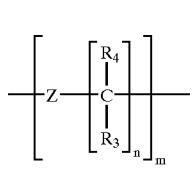

where of n is an integer greater than 1, preferably from 2 to 6 and m is an integer greater than 1, preferably from 2 to 200 the substituents $R_3$ and $R_4$ are independently the same or different and can be hydrogen, straight or branched alkyl of 1 to 20 carbon atoms (preferably from 1 to 6 carbon atoms, more preferably from 1 to 4 carbon atoms), aryl, unsaturated straight or branched alkenyl or alkynyl of 2 to 10 carbon atoms (preferably from 2 to 6 carbon atoms, more preferably from 2 to 4 carbon atoms), unsaturated straight or branched alkenyl of 2 to 6 carbon atoms, $C_3$–$C_8$ cycloalkyl, heterocyclyl, phenyl which may optionally have from 1–5 substituents on the phenyl ring, $C(=Y)R_9$, $C(=Y)NR_{10}R_{11}$, $YCR_{10}R_{11}R_{12}$ and $YC(=Y)R_{13}$, where Y may be $NR_{13}$, S or O (preferably O), $R_9$ is alkyl of from 1 to 20 carbon atoms, alkoxy of from 1 to 20 carbon atoms, aryloxy or hetero cyclyloxy, $R_{10}$ and $R_{11}$ are independently H or alkyl of from 1 to 20 carbon atoms, or $R_{10}$ and $R_{11}$ may be joined together to form an alkylene group of from 2 to 5 carbon atoms, thus forming a 3- to 6-membered ring, and $R_{12}$ and $R_{13}$ are H, straight or branched $C_1$–$C_{20}$, alkyl and aryl; n is typically at least 2 and preferably from 2 to 6 and m is typically at least 2 and preferably from 2 to 200. Included are, without limitation, poly(oxytetramethylene) glycols, poly(oxyethylene) glycols, poly(oxy-1,2-propylene) glycols, poly(alkyl sulfide) and the reaction products of ethylene glycol with a mixture of 1,2-propylene oxide and ethylene oxide. These materials are obtained by the (co)polymerization of alkylene oxides and such as ethylene oxide, propylene oxide, and tetrahydrofuran. The polyether or polysufide segment can be derived from a single polyether polyol, polysulfide polythiol or various blends thereof. Also, polyethers obtained from the oxyalkylation of various polyols, for example, diols such as 1,6-hexanediol or higher polyols such as trimethylolpropane and sorbitol, can be used. One commonly utilized oxyalkylation method is the reacting of a polyol with aikylene oxide such as ethylene or propylene oxide in the presence of an acidic or basic catalyst.

The polyfunctional initiator of the present invention is formed using classical esterification techniques from the corresponding polyether polyols or polysulfide thiols and halogenated acylating agent. For example, polyethylene glycol can be converted to the corresponding 2-bromoisobutyrate by the reaction of the glycol with 2-bromoisobutyryl bromide in the presence of a base such as imidazole. The polyfunctional initiator of the present invention can also be prepared through the condensation of the corresponding glycol or thiol with an appropriate halogenated carboxylic acid in the presence of an acid catalyst such as concentrated sulfuric acid. Finally, the polyfunctional initiator of the present invention can be prepared via trans-esterification of the glycol or thiol with a halogenated carboxlic acid ester such as ethyl 2-bromoisobutyrate in the presence of either an acid or base catalyst.

The polyether or polysulfide segment L typically has a number average molecular weight of 100 to 10,000 per segment, preferably 100 to 5,000, and most preferably 100 to 1,500 as measured by gel permeation chromatography (GPC) using a polystyrene standard.

The polyfunctional initiator of the present invention can be described more specifically by the structure V:

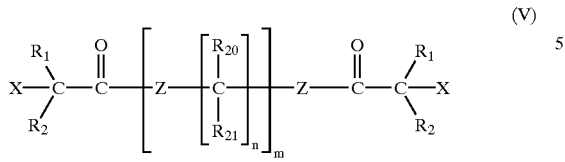

(V)

In which n, m, Z, X, $R_1$ and $R_2$ are as defined above and $R_{20}$ and $R_{21}$ can be independently the same or different H, straight or branched alkyl of 1 to 20 carbon atoms (preferably from 1 to 6 carbon atoms, more preferably from 1 to 4 carbon atoms), aryl, unsaturated straight or branched alkenyl or alkynyl of 2 to 10 carbon atoms (preferably from 2 to 6 carbon atoms, more preferably from 2 to 4 carbon atoms), unsaturated straight or branched alkenyl of 2 to 6 carbon atoms, $C_3$–$C_8$ cycloalkyl, heterocyclyl, phenyl which may optionally have from 1–5 substituents on the phenyl ring, $C(=Y)R_9$, $C(=Y)NR_{10}R_{11}$, $YCR_{10}R_{11}R_{12}$ and $YC(=Y)R_{13}$, where Y may be $NR_{13}$, S or O (preferably O), $R_9$ is alkyl of from 1 to 20 carbon atoms, alkoxy of from 1 to 20 carbon atoms, aryloxy or hetero cyclyloxy, $R_{10}$ and $R_{11}$ are independently H or alkyl of from 1 to 20 carbon atoms, or $R_{10}$ and $R_{11}$ may be joined together to form an alkylene group of from 2 to 5 carbon atoms, thus forming a 3- to 6-membered ring, and $R_{12}$ and $R_{13}$ are H, straight or branched $C_1$–$C_{20}$, alkyl and aryl. $R_{20}$ and/or $R_{21}$ also may have the structure:

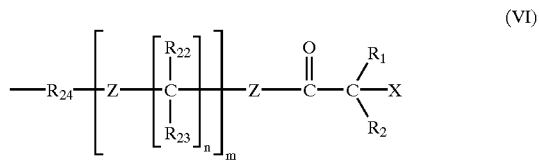

(VI)

where n, m, Z, X, $R_1$ and $R_2$ are as defined above and $R_{22}$ and $R_{23}$ can be independently the same or different and can be H, straight or branched alkyl of 1 to 20 carbon atoms (preferably from 1 to 6 carbon atoms, more preferably from 1 to 4 carbon atoms), aryl, unsaturated straight or branched alkenyl or alkynyl of 2 to 10 carbon atoms (preferably from 2 to 6 carbon atoms, more preferably from 2 to 4 carbon atoms), unsaturated straight or branched alkenyl of 2 to 6 carbon atoms, $C_3$–$C_8$ cycloalkyl, heterocyclyl, phenyl which may optionally have from 1–5 substituents on the phenyl ring, $C(=Y)R_9$, $C(=Y)NR_{10}R_{11}$, $YCR_{10}R_{11}R_{12}$ and $YC(=Y)R_{13}$, where Y may be $NR_{13}$, S or O (preferably O), $R_9$ is alkyl of from 1 to 20 carbon atoms, alkoxy of from 1 to 20 carbon atoms, aryloxy or hetero cyclyloxy, $R_{10}$ and $R_{11}$ are independently H or alkyl of from 1 to 20 carbon atoms, or $R_{10}$ and $R_{11}$ may be joined together to form an alkylene group of from 2 to 5 carbon atoms, thus forming a 3- to 6-membered ring, and $R_{12}$ and $R_{13}$ are H, straight or branched $C_1$–$C_{20}$, alkyl and aryl. $R_{24}$ is straight or branched alkyl of 1 to 20 carbon atoms (preferably from 1 to 6 carbon atoms, more preferably from 1 to 4 carbon atoms).

The polyfunctional initiator of the present invention typically has a number average molecular weight of 250 to 12,000, preferably 250 to 5,500, and most preferably 250 to 1,750 as measured by gel permeation chromatography (GPC) using a polystyrene standard.

In the present invention any radically polymerizable alkylene containing a polar group can serve as a monomer for (co)polymerization. The preferred monomers are ethylenically unsaturated monomers and include monomers having general structure VII:

(VII)

wherein $R_5$, and $R_6$ are independently selected from the group consisting of H, halogen, CN, $CF_3$, straight or branched alkyl of 1 to 20 carbon atoms (preferably from 1 to 6 carbon atoms, more preferably from 1 to 4 carbon atoms), aryl, unsaturated straight or branched alkenyl or alkynyl of 2 to 10 carbon atoms (preferably from 2 to 6 carbon atoms, more preferably from 2 to 4 carbon atoms), unsaturated straight or branched alkenyl of 2 to 6 carbon atoms (preferably vinyl) substituted (preferably at the α-position) with a halogen (preferably chlorine), $C_3$–$C_8$ cycloalkyl, heterocyclyl, phenyl which may optionally have from 1–5 substituents on the phenyl ring, $C(=Y)R_9$, $C(=Y)NR_{10}R_{11}$, $YCR_{10}R_{11}R_{12}$ and $YC(=Y)R_{12}$, where Y may be $NR_{13}$ or O (preferably O), $R_9$ is alkyl of from 1 to 20 carbon atoms, alkoxy of from 1 to 20 carbon atoms, aryloxy or heterocyclyloxy, $R_{10}$ and $R_{11}$ are independently H or alkyl of from 1 to 20 carbon atoms, or $R_{10}$ and $R_{11}$ may be joined together to form an alkylene group of from 2 to 5 carbon atoms, thus forming a 3- to 6-membered ring, and $R_{12}$ is H, straight or branched $C_1$–$C_{20}$, alkyl and aryl; and $R_7$ is selected from the group consisting of H, halogen (preferably fluorine or chlorine), $C_1$–$C_6$ (preferably $C_1$)alkyl, CN, $COOR_{14}$ (where $R_{14}$ is H, an alkali metal, or a $C_1$–$C_6$ alkyl group) or aryl; or $R_5$ and $R_7$ may be joined to form a group of the formula $(CH_2)_{n'}$ (which may be substituted with from 1 to 2n' halogen atoms or $C_1$–$C_4$ alkyl groups) or $C(=O)$—Y—$C(=O)$, where n' is from 2 to 6 (preferably 3 or 4) and Y is as defined above; and $R_8$ is the same as $R_5$ or $R_6$ or optionally $R_8$ is a CN group; at least two of $R_5$, $R_6$, and $R_7$ are H or halogen.

Specific examples of ethylenically unsaturated monomers that may be (co)polymerized by the ATRP process include ethylenically unsaturated monomers, allylic monomers, olefins (meth)acrylic acid, (meth)acrylates, (meth)acrylamide, N- and N,N-di-substituted (meth)acrylamides, vinyl aromatic monomers, vinyl halides, vinyl esters of carboxylic acids and mixtures thereof. More specific examples of suitable monomers include, without limitation, $C_1$–$C_{20}$ alkyl (meth)acrylates (including linear or branched alkyls and cycloalkyls) which include, but are not limited to, methyl (meth)acrylate, ethyl(meth)acrylate, propyl(meth)acrylate, isopropyl(meth)acrylate, n-butyl(meth)acrylate, iso-butyl (meth)acrylate, tert-butyl(meth)acrylate, 2-ethylhexyl(meth) acrylate, lauryl(meth)acrylate, isobornyl(meth)acrylate, cyclohexyl(meth)acrylate, 3,3,5-trimethylcyclohexyl(meth) acrylate and isocane(meth)acrylate; oxirane functional (meth)acrylates which include, but are not limited to, glycidyl(meth)acrylate, 3,4-epoxycyclohexylmethyl(meth) acrylate, and 2-(3,4-epoxycyclohexyl) ethyl(meth)acrylate; hydroxy alkyl(meth)acrylates having from 2 to 4 carbon atoms in the alkyl group which include, but are not limited to, hydroxyethyl (meth)acrylate, hydroxypropyl(meth) acrylate and hydroxybutyl(meth)acrylate. The residues may each independently be residues of monomers having more than one (meth)acryloyl group, such as (meth)acrylic anhydride, diethyleneglycol bis(meth)acrylate, 4,4'-isopropylidenediphenol bis(meth)acrylate (Bisphenol A di(meth)acrylate), alkoxylated 4,4'-isopropylidenediphenol bis(meth)acrylate, trimethylolpropane tris(meth)acrylate and alkoxylated trimethylolpropane tris(meth)acrylate.

In the context of the present application, the terms "alkyl", "alkenyl" and "alkynyl" refer to straight-chain or branched groups. Furthermore, in the present application, "aryl" refers to phenyl, naphthyl, phenanthryl, phenalenyl, anthracenyl, triphenylenyl, fluoranthenyl, pyrenyl, pentacenyl, chrysenyl, naphthacenyl, hexaphenyl, picenyl and perylenyl (preferably phenyl and naphthyl), in which each hydrogen atom may be replaced with alkyl of from 1 to 20 carbon atoms (preferably from 1 to 6 carbon atoms and more preferably methyl), alkyl of from 1 to 20 carbon atoms (preferably from 1 to 6 carbon atoms and more preferably methyl) in which each of the hydrogen atoms is independently replaced by a halide (preferably a fluoride or a chloride), alkenyl of from 2 to 20 carbon atoms, alkynyl of from 1 to 20 carbon atoms, alkoxy of from 2 to 6 carbon atoms, alkylthio of from 1 to 6 carbon atoms, $C_3$–$C_8$ cycloalkyl, phenyl, halogen, $NH_2$, $C_1$–$C_6$-alkylamino, $C_1$–$C_6$-dialkylamino, and phenyl which may be substituted with from 1 to 5 halogen atoms and/or $C_1$–$C_4$ alkyl groups. (This definition of "aryl" also applies to the aryl groups in "aryloxy" and "aralkyl.") Thus, phenyl may be substituted from 1 to 5 times and naphthyl may be substituted from 1 to 7 times (preferably, any aryl group, if substituted, is substituted from 1 to 3 times) with one of the above substituents. More preferably, "aryl" refers to phenyl, naphthyl, phenyl substituted from 1 to 5 times with fluorine or chlorine, and phenyl substituted from 1 to 3 times with a substituent selected from the group consisting of alkyl of from 1 to 6 carbon atoms, alkoxy of from 1 to 4 carbon atoms and phenyl. Most preferably, "aryl" refers to phenyl and tolyl.

Specific examples of vinyl aromatic monomers that may be used to prepare the (co)polymer include, but are not limited to, styrene, p-chloromethyl styrene, divinyl benzene, vinyl naphthalene and divinyl naphthalene. Vinyl halides that may be used to prepare the graft co(co)polymer include, but are not limited to, vinyl chloride, p-chloromethylstyrene, vinyl chloroacetate and vinylidene fluoride. Vinyl esters of carboxylic acids that may be used to prepare the (co)polymer include, but are not limited to, vinyl acetate, vinyl butyrate, vinyl 3,4-dimethoxybenzoate and vinyl benzoate.

In the context of the present invention, "heterocyclyl" refers to pyridyl, furyl, pyrrolyl, thienyl, imidazolyl, pyrazolyl, pyrazinyl, pyrimidinyl, pyridazinyl, pyranyl, indolyl, isoindolyl, indazolyl, benzofuryl, isobenzofuryl, benzothienyl, isobenzothienyl, chromenyl, xanthenyl, purinyl, pteridinyl, quinolyl, isoquinolyl, phthalazinyl, quinazolinyl, quinoxalinyl, naphthyridinyl, phenoxathiinyl, carbazolyl, cinnolinyl, phenanthridinyl, acridinyl, 1,10-phenanthrolinyl, phenazinyl, phenoxazinyl, phenothiazinyl, oxazolyl, thiazolyl, isoxazolyl, isothiazolyl, and hydrogenated forms thereof known to those in the art. Preferred heterocyclyl groups include pyridyl, furyl, pyrrolyl, thienyl, imidazolyl, pyrazolyl, pyrazinyl, pyrimidinyl, pyridazinyl, pyranyl and indolyl, the most preferred heterocyclyl group being pyridyl. Accordingly, suitable vinyl heterocycles to be used as a monomer in the present invention include 2-vinyl pyridine, 4-vinyl pyridine, 2-vinyl pyrrole, 3-vinyl pyrrole, 2-vinyl oxazole, 4-vinyl oxazole, 5-vinyl oxazole, 2-vinyl thiazole, 4-vinyl thiazole, 5-vinyl thiazole, 2-vinyl imidazole, 4-vinyl imidazole, 3-vinyl pyrazole, 4-vinyl pyrazole, 3-vinyl pyridazine, 4-vinyl pyridazine, 3-vinyl isoxazole, 3-vinyl isothiazoles, 2-vinyl pyrimidine, 4-vinyl pyrimidine, 5-vinyl pyrimidine, and any vinyl pyrazine, the most preferred being 2-vinyl pyridine. The vinyl heterocycles mentioned above may bear one or more (preferably 1 or 2) $C_1$–$C_6$ alkyl or alkoxy groups, cyano groups, ester groups or halogen atoms, either on the vinyl group or the heterocyclyl group, but preferably on the heterocyclyl group. Further, those vinyl heterocycles which, when unsubstituted, contain an N—H group which may be protected at that position with a conventional blocking or protecting group, such as a $C_1$–$C_6$ alkyl group, a tris-$C_1$–$C_6$ alkylsilyl group, an acyl group of the formula $R_{15}$ CO (where $R_{15}$ is alkyl of from 1 to 20 carbon atoms, in which each of the hydrogen atoms may be independently replaced by halide, preferably fluoride or chloride), alkenyl of from 2 to 20 carbon atoms (preferably vinyl), alkynyl of from 2 to 10 carbon atoms (preferably acetylenyl), phenyl which may be substituted with from 1 to 5 halogen atoms or alkyl groups of from 1 to 4 carbon atoms, or aralkyl (aryl-substituted alkyl, in which the aryl group is phenyl or substituted phenyl and the alkyl group is from 1 to 6 carbon atoms), etc. (This definition of "heterocyclyl," also applies to the heterocyclyl groups in "heterocyclyloxy" and "heterocyclic ring.")

More specifically, preferred monomers include, but not limited to, styrene, p-chloromethylstyrene, vinyl chloroacetate, acrylate and methacrylate esters of $C_1$–$C_{20}$ alcohols, isobutene, 2-(2-bromopropionoxy) ethyl acrylate, acrylonitrile, and methacrylonitrile.

As used herein and in the claims, by "allylic monomer(s)" is meant monomers containing substituted and/or unsubstituted allylic functionality, i.e., one or more radicals represented by the following general formula VII,

$$H_2C=C(R_{16})—CH_2— \hspace{2cm} (VII)$$

wherein $R_{16}$ is hydrogen, halogen or a $C_1$ to $C_4$ alkyl group. Most commonly, $R_1$ is hydrogen or methyl and consequently general formula VII represents the unsubstituted (meth)allyl radical. Examples of allylic monomers may each independently be residues of, but are not limited to, (meth)allyl ethers, such as methyl (meth)allyl ether and (meth)allyl glycidyl ether; allyl esters of carboxylic acids, such as (meth)allyl acetate, (meth)allyl butyrate, (meth)allyl 3,4-dimethoxybenzoate and (meth)allyl benzoate.

Other ethylenically unsaturated radically (co)polymerizable monomers that may be used to prepare the (co)polymer include, but are not limited to: cyclic anhydrides, e.g., maleic anhydride, 1-cyclopentene-1,2-dicarboxylic anhydride and itaconic anhydride; esters of acids that are unsaturated but do not have α,β-ethylenic unsaturation, e.g., methyl ester of undecylenic acid; diesters of ethylenically unsaturated dibasic acids, e.g., di($C_1$–$C_4$ alkyl)ethyl maleates; maleimide and N-substituted maleimides.

In an embodiment of the present invention, the monomer includes a hydrophobic residue of a monomer selected from oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof: $C_6$–$C_{20}$ alkyl (meth)acrylates, e.g., including those as previously recited herein; aromatic (meth)acrylates, e.g., phenyl (meth)acrylate, p-nitrophenyl (meth)acrylate and benzyl (meth)acrylate; polycyclicaromatic (meth) acrylates, e.g., 2-naphthyl (meth)acrylate; vinyl esters of carboxylic acids, e.g., hexanoic acid vinyl ester and decanoic acid vinyl ester; N,N-di($C_1$–$C_8$ alkyl) (meth) acrylamides; maleimide; N—($C_1$–$C_{20}$ alkyl) maleimides; N—($C_3$–$C_8$ cycloalkyl) maleimides; N-(aryl) maleimides; and mixtures thereof. Examples of N-substituted maleimides include, but are not limited to, N—($C_1$–$C_{20}$ linear or branched alkyl) maleimides, e.g., N-methyl maleimide, N-tertiary-butyl maleimide, N-octyl maleimide and N-icosane maleimide; N-($C_3$–$C_8$ cycloalkyl) maleimides, e.g., N-cyclohexyl maleimide; and N-(aryl) maleimides, e.g., N-phenyl maleimide, N—($C_1$–$C_9$ linear or branched alkyl substituted phenyl) maleimide, N-benzyl maleimide and N—($C_1$–$C_9$ linear or branched alkyl substituted benzyl) maleimide.

The oxirane functional monomer or its residue that is reacted with a carboxylic acid, may be selected from, for example, glycidyl (meth)acrylate, 3,4-epoxycyclohexylmethyl(meth)acrylate, 2-(3,4-epoxycyclohexyl) ethyl(meth)acrylate, allyl glycidyl ether and mixtures thereof. Examples of carboxylic acids that may be reacted with the oxirane functional monomer or its residue include, but are not limited to, para-nitrobenzoic acid, hexanoic acid, 2-ethyl hexanoic acid, decanoic acid, undecanoic acid and mixtures thereof.

The monomer containing at least one polar group may be present in an amount of 5 to 100 wt % by weight based on the total amount of monomers. A preferred amount of the monomer containing at least one polar group is 10 to 100 wt %; the most preferred amount is 20 to 100 wt % based on the total amount of monomers. This is particularly important in the case of acrylonitrile because an amount of at least 20 wt % assures solvent resistance properties of the resulting (co)polymer A.

In the ATRP preparation of the (co)polymer of the present invention, the amounts and relative proportions of the initiator, the transition metal compound and the ligand are those for which ATRP is most effectively performed. The amount of initiator used can vary widely and is typically present in the reaction medium in a concentration of from $10^{-4}$ moles/liter (M) to 3 M, for example, from $10^{-3}$ M to $10^{-1}$ M. As the molecular weight of the (co)polymer product can be directly related to the relative concentrations of initiator and monomer(s), the molar ratio of initiator to monomer is an important factor in (co)polymer preparation. The molar ratio of initiator to monomer is typically within the range of $10^{-4}$:1 to 0.5:1, for example, $10^{-3}$:1 to $5 \times 10^{-2}$:1.

In preparing the (co)polymer by ATRP methods, the molar ratio of transition metal compound to initiator is typically in the range of $10^{-4}$:1 to 10:1, for example, 0.1:1 to 5:1. The molar ratio of ligand to transition metal compound is typically within the range of 0.1:1 to 100:1, for example, 0.2:1 to 10:1.

The (co)polymer may be prepared in the absence of solvent, i.e., by means of a bulk (co)polymerization process. Generally, the (co)polymer is prepared in the presence of a solvent, typically an organic solvent. Classes of useful organic solvents include, but are not limited to, esters of carboxylic acids, ethers, cyclic ethers, $C_5$–$C_{10}$ alkanes, $C_5$–$C_8$ cycloalkanes, aromatic hydrocarbon solvents, halogenated hydrocarbon solvents, amides, nitrites, sulfoxides, sulfones and mixtures thereof. Supercritical solvents, such as $CO_2$, $C_1$–$C_4$ alkanes and fluorocarbons, may also be employed. A preferred class of solvents are the aromatic hydrocarbon solvents, particularly preferred examples of which are xylene, toluene, and mixed aromatic solvents such as those commercially available from Exxon Chemical America under the trademark SOLVESSO. Additional solvents are described in further detail in U.S. Pat. No. 5,807,937 at column 21, line 44 through column 22, line 54.

The ATRP preparation of the (co)polymer is typically conducted at a reaction temperature within the range of 25° C. to 140° C., preferably from 50° C. to 100° C., and a pressure within the range of 1 to 100 atmospheres, usually at ambient pressure. The atom transfer radical (co)polymerization is typically completed in less than 24 hours, preferably between 1 and 8 hours.

The ATRP transition metal catalyst and its associated ligand are typically separated or removed from the (co)polymer product prior to its use. Removal of the ATRP catalyst may be achieved using known methods, including, for example, adding a catalyst binding agent to the a mixture of the (co)polymer, solvent and catalyst, followed by filtering. Examples of suitable catalyst binding agents include, for example, alumina, silica, clay or a combination thereof. A mixture of the (co)polymer, solvent and ATRP catalyst may be passed through a bed of catalyst binding agent. Alternatively, the ATRP catalyst may be oxidized in situ, the oxidized residue of the catalyst being retained in the (co)polymer.

The (co)polymers of the present invention include a variety of structures, depending upon the structure of the initiator, the monomers used in propagating the (co)polymer, the reaction conditions and the method of termination of the polymerization process. The (co)polymers of the present invention typically have star-like structures when the (co)polymers are produced by propagating a (co)polymer chain on the above-described poly-functional initiator (three or more initiation sites). Linear (co)polymers can be prepared through the use of di-functional initiators.

The initiators may include active hydrogen-containing groups to permit crosslinking of the initiator by known crosslinking methods. The initiator may include other functionality, such as an ionic group or a group that can be converted into an ionic group, such as a quaternary amine group or a sulfonium group. An ionic group-containing (co)polymer prepared in such a manner can be useful as a component of an electrodepositable film-forming composition for use in preparing a coating layer on an electroconductive substrate. The initiator may further contain an active group that permits grafting of other groups to the (co)polymer, such as (co)polymer chains that cannot be prepared by a controlled radical (co)polymerization process. An example of such a chain is a polyoxyalkylene chain, which may be useful in solubilizing the (co)polymer, depending upon the intended use for the (co)polymer.

The choice of monomers used in preparing the (co)polymer also is an important factor in determining the structure of the (co)polymer. A homopolymer will be produced if only one monomer is used. (Co)polymers may be mixed (co)polymers produced by chain propagation in the presence of two monomers. Block (co)polymers can be produced by chain propagation with a sequence of difference monomers. The use of hydrophilic monomers (i.e., a poly (alkylene glycol) (meth)acrylate or hydrophobic monomers, i.e. an alkyl (meth)acrylate), will dictate the hydrophobicity and hydrophilicity of defined portions of the (co)polymer structure. The use of active hydrogen-containing monomers, i.e., a hydroxyalkyl (meth)acrylate, a (meth)acrylamide or (meth)acrylic acid, will dictate the reactivity of portions of the (co)polymer to crosslinkers and/or other co-reactive group-containing materials.

As described above, the (co)polymer may have nonionic moieties, ionic moieties and combinations thereof. In an embodiment of the present invention, the monomer can be selected from, for example, poly(alkylene glycol) (meth) acrylates; $C_1$–$C_4$ alkoxy poly(alkylene glycol) (meth) acrylates; hydroxyalkyl (meth)acrylates having from 2 to 4 carbon atoms in the alkyl group; N—(hydroxy $C_1$–$C_4$ alkyl) (meth)acrylamides, e.g., N-hydroxymethyl (meth) acrylamide and N—(2-hydroxyethyl) (meth)acrylamide;

N,N-di-(hydroxy $C_1$–$C_4$ alkyl) (meth)acrylamides (e.g., N,N-di(2-hydroxyethyl) (meth)acrylamide); carboxylic acid functional monomers; salts of carboxylic acid functional monomers; amine functional monomers; salts of amine functional monomers; and mixtures thereof.

Poly(alkylene glycol) (meth)acrylates and $C_1$–$C_4$ alkoxy poly(alkylene glycol) (meth)acrylates are prepared by known methods. For example, (meth)acrylic acid or hydroxyalkyl (meth)acrylate, e.g., 2-hydroxyethyl (meth)acrylate, may be reacted with one or more alkylene oxides, e.g., ethylene oxide, propylene oxide and butylene oxide. Alternatively, an alkyl (meth)acrylate may be transesterified with a $C_1$–$C_4$ alkoxy poly(alkylene glycol), e.g., methoxy poly(ethylene glycol). Examples of poly(alkylene glycol) (meth)acrylates and $C_1$–$C_4$ alkoxy poly(alkylene glycol) (meth)acrylates include, poly(ethylene glycol) (meth)acrylate and methoxy poly(ethylene glycol) (meth)acrylate, the poly(ethylene glycol) moiety of each having a molecular weight of from 100 to 800. An example of a commercially available $C_1$–$C_4$ alkoxy poly(alkylene glycol) (meth)acrylate is methoxy poly(ethylene glycol) 550 methacrylate monomer from Sartomer Company, Inc.

Examples of carboxylic acid functional monomers include, but are not limited to, (meth)acrylic acid, maleic acid, fumaric acid and undecylenic acid. The monomer may be a residue of a precursor of a carboxylic acid functional monomer that is converted to a carboxylic acid residue after completion of the controlled radical (co)polymerization, e.g., maleic anhydride, di($C_1$–$C_4$ alkyl) maleates and $C_1$–$C_4$ alkyl (meth)acrylates. For example, residues of maleic anhydride can be converted to diacid residues, ester/acid residues or amide/acid residues by art-recognized reactions with water, alcohols or primary amines, respectively. Residues of $C_1$–$C_4$ alkyl (meth)acrylates, such as t-butyl methacrylate, can be converted to (meth)acrylic acid residues by art-recognized ester hydrolyzation methods, which typically involve the concurrent removal of an alcohol, such as t-butanol by vacuum distillation. Salts of carboxylic acid functional monomers include, for example, salts of (meth) acrylic acid and primary, secondary or tertiary amines, such as, butyl amine, dimethyl amine and triethyl amine.

Amine functional monomers include, for example, amino ($C_2$–$C_4$ alkyl) (meth)acrylates, e.g., 2-aminoethyl (meth)acrylate, 3-aminopropyl (meth)acrylate and 4-aminobutyl (meth)acrylate; N—($C_1$–$C_4$ alkyl)amino($C_1$–$C_4$ alkyl) (meth)acrylates, e.g., N-methyl-2-aminoethyl (meth) acrylate; and N,N-di($C_1$–$C_4$ alkyl)amino($C_2$–$C_4$ alkyl) (meth)acrylates, e.g., N,N-dimethyl-2-aminoethyl (meth) acrylate. The monomer may also comprise residues of salts of amine functional monomers, e.g., salts of those amine functional monomers as recited previously herein. Salts of the amine functional monomer residues may be formed by mixing a carboxylic acid, e.g., lactic acid, with the (co)polymer after completion of controlled radical (co)polymerization.

In an embodiment of the present invention, the (co)polymer can contain a segment that includes carboxylic acid functional monomers selected from (meth)acrylic acid, maleic anhydride, maleic acid, di($C_1$–$C_4$ alkyl) maleates, and mixtures thereof. In a still further embodiment of the present invention, the (co)polymer segment is a residue of amine functional monomers selected from amino($C_2$–$C_4$ alkyl) (meth)acrylates, N—($C_1$–$C_4$ alkyl)amino($C_2$–$C_4$ alkyl) (meth)acrylates, N,N-di($C_1$–$C_4$ alkyl)amino($C_2$–$C_4$ alkyl) (meth)acrylates and mixtures thereof.

The (co)polymer also may contain a segment that contains cationic moieties selected from ammonium, sulphonium and phosphonium. Ammonium, sulphonium and phosphonium moieties may be introduced into the graft (co)polymer by means known to the skilled artisan. For example, when the (co)polymer contains a residue of N,N-dimethyl-2-aminoethyl (meth)acrylate, the N,N-dimethylamino moieties may be converted to ammonium moieties by mixing an acid, e.g., lactic acid, with the (co)polymer.

When the segment of the (co)polymer contains residues of oxirane functional monomers, such as glycidyl (meth) acrylate, the oxirane groups may be used to introduce sulphonium or phosphonium moieties into the (co)polymer. Sulphonium moieties may be introduced into the (co)polymer by reaction of the oxirane groups with thiodiethanol in the presence of an acid, such as lactic acid. Reaction of the oxirane groups with a phosphine, e.g., triphenyl phosphine or tributyl phosphine, in the presence of an acid, such as lactic acid, results in the introduction of phosphonium moieties into the graft (co)polymer.

The (co)polymer can be a block (co)polymer having one or more segments. In a two-segment (co)polymer, the (co)polymer may have the general formula VIII:

$\phi$-($A_p$-$B_s$-X)$_t$ (VIII)

where each of A and B in general formula V may represent one or more types of monomer residues, while p and s represent the average total number of A and B residues occurring per block or segment of A residues (A-block or A-segment) and B residues (B-block or B-segment), respectively, t is an integer greater than one and refers to the number of initiator sites present on the initiator, $\phi$ is the residue from the initiator and X is a halide. When containing more than one type or species of monomer residue, the A- and B-blocks may each have at least one of random, block, e.g., di-block and tri-block, alternating and gradient architectures. Gradient architecture refers to a sequence of different monomer residues that changes gradually in a systematic and predictable manner along the (co)polymer backbone. For purposes of illustration, an A-block containing 6 residues of methyl methacrylate (MMA) and 6 residues of ethyl methacrylate (EMA), for which p is 12, may have di-block, tetra-block, alternating and gradient architectures as represented in general formulas IX, X, XI, and XII.

Di-Block Architecture

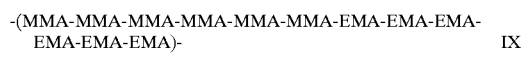

-(MMA-MMA-MMA-MMA-MMA-MMA-EMA-EMA-EMA-EMA-EMA-EMA)- IX

Tetra-Block Architecture

-(MMA-MMA-MMA-EMA-EMA-EMA-MMA-MMA-MMA-EMA-EMA-EMA)- X

Alternating Architecture

-(MMA-EMA-MMA-EMA-MMA-EMA-MMA-EMA-MMA-EMA-MMA-EMA)- XI

Gradient Architecture

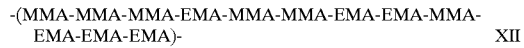

-(MMA-MMA-MMA-EMA-MMA-MMA-EMA-EMA-MMA-EMA-EMA-EMA)- XII

The B-block may be described in a manner similar to that of the A-block.

The order in which monomer residues occur along the backbone of the (co)polymer typically is determined by the order in which the corresponding monomers are fed into the vessel in which the controlled radical (co)polymerization is conducted. For example, the monomers that are incorporated as residues in the A-block of the graft (co)polymer are generally fed into the reaction vessel prior to those monomers that are incorporated as residues in the B-block.

During formation of the A- and B-blocks, if more than one monomer is fed into the reaction vessel at a time, the relative reactivities of the monomers typically determines the order in which they are incorporated into the living polymer chain. Gradient sequences of monomer residues within the A- and B-blocks can be prepared by controlled radical polymerization, and in particular by ATRP methods by (a) varying the ratio of monomers fed to the reaction medium during the course of the (co)polymerization, (b) using a monomer feed containing monomers having different rates of polymerization, or (c) a combination of (a) and (b). (Co)polymers containing gradient architecture are described in further detail in U.S. Pat. No. 5,807,937 at column 29, line 29 through column 31, line 35.

Subscripts p and s represent average numbers of residues occurring in the respective A- and B-blocks. Typically, subscript s has a value of at least 1, and preferably at least 5 for general formula 1. Also, subscript s has a value of typically less than 300, preferably less than 100, more preferably less than 50, and most preferably 20 or less, for general formula 1. The value of subscript s may range between any combination of these values, inclusive of the recited values, e.g., s may be a number from 1 to 100. Subscript p may be 0, or may have a value of at least 1, and preferably at least 5. Subscript p also typically has a value of less than 300, preferably less than 100, more preferably less than 50, and most preferably 20 or less. The value of subscript p may range between any combination of these values, inclusive of the recited values, e.g., p may be a number from 0 to 50.

The (co)polymer typically has a number average molecular weight (Mn) of from 400 to 10,000, preferably from 400 to 5,00 and most preferably from 400 to 1,600, as determined by gel permeation chromatography using polystyrene standards. The polydispersity index, i.e., weight average molecular weight (Mw) divided by Mn, of graft portion(s) of the co(co)polymer typically are less than 2.0, e.g., less than 1.8 or less than 1.5.

Symbol φ of general formula VIII is or is derived from the residue of the initiator used in the preparation of the (co)polymer by controlled radical (co)polymerization, and is free of the radically transferable group of the initiator. In general, the residue will be of general formula XIII:

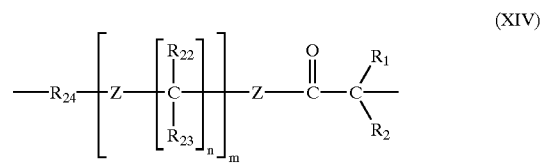

in which n is an integer greater than 1, preferably from 2 to 6; m is an integer greater than 1, preferably from 2 to 200; Z is oxygen or sulfer; $R_1$ and $R_2$ are independently the same or different and are selected from the group consisting of hydrogen, straight or branched alkyl of 1 to 20 carbon atoms, unsaturated straight or branched alkenyl of 2 to 10 carbon atoms, unsaturated straight or branched alkynyl of 2 to 10 carbon atoms, $C_3$–$C_8$ cycloalkyl, aryl and heterocyclyl; $R_{20}$ and $R_{21}$ are independently the same or different hydrogen, straight or branched alkyl of 1 to 20 carbon atoms, unsaturated straight or branched alkenyl or alkynyl of 2 to 10 carbon atoms, $C_3$–$C_8$ cycloalkyl, aryl, heterocyclyl or a structure according to the formula XIV:

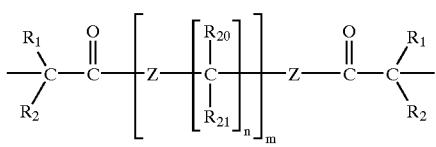

in which n, m, Z, $R_1$ and $R_2$ are defined as above; $R_{22}$ and $R_{23}$ are independently the same or different hydrogen, straight or branched alkyl of 1 to 20 carbon atoms, unsaturated straight or branched alkenyl or alkynyl of 2 to 10 carbon atoms, $C_3$–$C_8$ cycloalkyl, aryl or heterocyclyl; and $R_{24}$ is straight or branched alkyl of 1 to 20 carbon atoms.

As a specific example, when the (co)polymer is initiated in the presence di-(tmp)-tetra-(2-haloisobutyrate); t=4, the symbol φ, more specifically φ-, is the tetra-functional residue of formula XV:

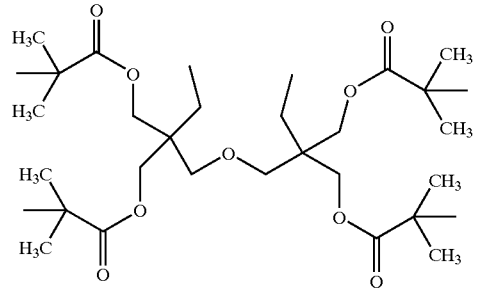

In the process of the present invention, the radically transferable group is a halide group, preferably a bromide group. For example, in general, formula VIII, X may be the radically transferable halide group of an ATRP initiator. The halide residue may be (a) left on the (co)polymer, (b) removed or (c) chemically converted to another moiety. The radically transferable group may be removed by substitution with a nucleophilic compound, e.g., an alkali metal alkoxylate. Graft-group-terminal halogens can be removed from the (co)polymer by means of a mild dehalogenation reaction. The reaction is typically performed as a post-reaction after the graft (co)polymer has been formed, and in the presence of at least an ATRP catalyst. Preferably, the dehalogenation post-reaction is performed in the presence of both an ATRP catalyst and its associated ligand.

The (co)polymers and graft (co)polymers of the present invention can be used as, without limitation, film-forming compositions, rheology modifiers, pigment or ink dispersants, gel matrices and molding resins. The fields of use of the (co)polymers are varied and include, without limitation, articles and industrial uses, such as in the automotive industry, medical uses, such as in the production of novel films and matrices for use in bioengineering and tissue engineering, pharmaceutical uses, such as in the production of drug delivery matrices and chemical industry uses, such as in the preparation of gels for product separation and purification, and in chemical and biological research, such as in tailored gel matrices for reagent purification.

The present invention is more particularly described in the following examples, which are intended to be illustrative only, since numerous modifications and variations therein will be apparent to those skilled in the art. Unless otherwise specified, all parts and percentages are by weight.

EXAMPLE 1

Synthesis of Tetrafunctional Initiator

A monomeric initiator having four radically transferable groups was prepared from the ingredients as enumerated in the following Table A. The monomeric initiator of Example A was used in the controlled radical (co)polymerization of Example B.

TABLE A

| Ingredients | Parts by weight |
|---|---|
| Charge 1 | |
| Di-trimethylolpropane | 60.0 |
| Imidazole | 71.8 |
| Tetrahydrofuran | 600.0 |
| Charge 2 | |
| 2-Bromoisobutyryl bromide | 242.5 |
| Charge 3 | |
| Deionized water | 300.0 |

Charge 1 was added to a 2 liter 4-necked flask equipped with a motor driven stainless steel stir blade, water cooled condenser, and a heating mantle and thermometer connected through a temperature feed-back control device. The contents of the flask were cooled to 15° C. With continuous stirring, Charge 2 was added to the flask over a period of 55 minutes, during which time the contents of the flask were observed to exotherm to a temperature of 55° C. With the completion of the addition of Charge 2, the contents of the flask were heated to and held at 60° C. for 4 hours. Upon cooling the contents of the flask to ambient room temperature, Charge 3 was added to the flask. The contents of the flask were transferred to a separatory funnel, the retained organic layer was dried over calcium sulfate and the tetrahydrofuran was removed by vacuum distillation.

EXAMPLE 2

(Co)polymerization Using Tetrafunctional Initiator

A (co)polymer was prepared by controlled radical (co)polymerization from the ingredients as enumerated in the following Table B. The (co)polymer of Example B was modified to form a pigment dispersant as described in Example C.

TABLE B

| Ingredients | Parts by weight |
|---|---|
| Charge 1 | |
| Toluene | 60.0 |
| Copper powder[1] | 0.64 |
| 2,2'-Bipyridyl | 0.78 |
| Charge 2 | |
| Monomeric initiator of Example 1 | 10.6 |
| Iso-butyl methacrylate monomer (IBMA) | 85.3 |

TABLE B-continued

| Ingredients | Parts by weight |
|---|---|
| Charge 3 | |
| Glycidyl methacrylate monomer (GMA) | 21.3 |
| Toluene | 25.0 |
| Charge 4 | |
| MPEG 550 MA monomer[2] | 242.9 |
| Toluene | 150.0 |
| Charge 5 | |
| Magnesium silicate[3] | 100.0 |

[1]The copper powder had an average particle size of 25 microns, a density of 1 gram/cm$^3$, and was obtained commercially from OMG Americas.
[2]MPEG 550 MA monomer is a methoxy poly(ethylene glycol) methacrylate monomer from Sartomer Company, Inc.
[3]MAGNESOL synthetic magnesium silicate obtained commercially from The Dallas Group of America.

Charge 1 was added under a nitrogen sparge to a 1 liter 4-necked flask equipped with a motor driven stainless steel stir blade, water cooled condenser, and a heating mantle and thermometer connected through a temperature feed-back control device. With stirring, Charge 2 was added to the flask at ambient room temperature. The contents of the flask were heated to 85° C. and were held at that temperature for 3 hours. The contents of the flask were cooled to 80° C. and Charge 3 was added over a period of 15 minutes, followed by a 1.75 hour hold at 80° C. After cooling the contents of the flask to 70° C., Charge 4 was added over a period of 40 minutes, followed by a 4 hour hold at 70° C. Charge 5 was then added, and the contents of the flask were passed through a filter-press packed with MAGNESOL synthetic magnesium silicate. The filtered resin was then vacuum stripped, and the solids of the resin was adjusted to 70 percent by weight, based on total weight, by the addition of methyl 2-hydroxypropyl ether. The (co)polymer of Example B was found to have: Mn=15,130; Mw=20,445; z average molecular weight (Mz)=27,330; and a polydispersity index (PDI) (i.e., Mw/Mn)=1.35.

EXAMPLE 3

Modification of Resin for Use as a Pigment Dispersant

A pigment dispersant useful in the pigment dispersions of the present invention was prepared from the (co)polymer of Example B using the ingredients as enumerated in Table C.

TABLE C

| Ingredients | Parts by weight |
|---|---|
| (Co)polymer of Example 2[4] | 350.0 |
| Para-nitrobenzoic acid | 8.23 |
| Ethyltriphenylphosphonium iodide catalyst | 0.54 |

[4]70 percent by weight, based on weight in methyl 2-hydroxypropyl ether.

The ingredients listed in Table C were added to a 1 liter round bottom flask equipped with a motor driven stainless steel stir blade, water cooled reflux condenser, and a heating mantle and thermometer connected through a temperature feed-back control device. The contents of the flask were heated to and held at 110° C. for 10 hours. Upon cooling to room temperature, the contents of the flask were mixed with deionized water to form an aqueous composition having a resin solids content of 17.8 percent by weight, based on total weight.

EXAMPLE 4

Pigment Dispersant Using Resin From Tetrafunctional Initiator

A pigment dispersion according to the present invention, was prepared using the ingredients enumerated in Table D.

TABLE D

| Ingredients | Parts by weight |
| --- | --- |
| Pigment dispersant of Example 3 | 175.6 |
| Defoamer[5] | 1.0 |
| Deionized water | 96.6 |
| Chlorinated copper phthalocyanine Blue pigment[6] | 63.0 |
| Aqueous dimethylethanolamine[7] | 11.3 |

[5]BYK 031 defoamer from Byk-Chemie.
[6]B-4816 Palomar Blue chlorinated copper phthalocyanine blue pigment obtained from Bayer.
[7]50 percent by weight dimethylethanolamine in deionized water.

EXAMPLE 5

Synthesis of Star Block-co(co)polymer Using Tetrafunctional Initiator—Di-TMP Tetra(2-bromoisobutyrate)

A star block copolymer according to the present invention, was prepared using the ingredients enumerated in Table E.

TABLE E

| Ingredients | Parts by weight |
| --- | --- |
| Charge 1 | |
| Aromatic 100[8] | 2.61 |
| Copper | 0.04 |
| 2,2'-Bypyridyl | 0.07 |
| Copper(II) bromide | 0.05 |
| Di-TMP tetra(2-bromoisobutyrate) | 1.70 |
| IBMA | 3.52 |
| Charge 2 | |
| Aromatic-100 | 0.87 |
| GMA | 1.04 |

[8]AROMATIC 100 is an aromatic solvent blend, commercially available from Exxon.

Charge 1 was heated in a reaction vessel with agitation at 70° C. and the reaction mixture was held at this temperature for 2 hours. The charge 2 was added over a period of 5 minutes. The reaction mixture was held at 70° C. for one hour. The reaction mixture was cooled and filtered. The resultant star-diblock copolymer had a total solid content of 64.2 percent determined at 110° C. for one hour. The co(co)polymer had number average molecular weight, Mn=3,870 and polydispersity Mw/Mn=1.4 (determined by gel permeatiom chromatography using polystyrene as a standard). The $^1$H NMR spectrum is fully consistent with four arm star of IBMA-b-GMA, exibiting all key absorbtion of monomers used and the peak arising from initiator.

Calculation of initiator efficiency: Mn(experimental via $^1$H NMR)=2,668; Mn(theory)=3,128; initiator efficiency=Mn(experimental via $^1$H NMR)/Mn(theory)×100%=2,668/3,128×100%=85.3%.

The present invention has been described with reference to specific details of particular embodiments thereof. It is not intended that such details be regarded as limitations upon the scope of the invention except insofar as and to the extent that they are included in the accompanying claims.

We claim:

1. A (co)polymer prepared by a controlled radical (co)polymerization process that is conducted in the presence of an initiator having the structure R—[L—I]$_n$: in which,
   a) n is an integer greater than 1;
   b) R is an organic n-valent linking group containing at least one linkage selected from the group consisting of ether and sulfide;
   c) L is optionally present for each instance of I and is a divalent segment selected from the group consisting of polyether and polysulfide, each instance of which may be the same or different; and
   d) I is a group having the structure:

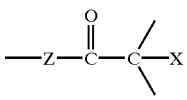

in which X is a halide and Z is selected from the group consisting off oxygen and sulfur; in which, for each instance of I, each instance of X and Z may be the same or different.

2. The (co)polymer of claim 1 in which the structure of I is further defined as:

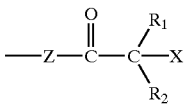

in which:
   a) X is a halide;
   b) Z is selected from the group consisting of oxygen and sulfur; and
   c) R$_1$ and R$_2$ are independently the same or different and are selected from the group consisting of hydrogen, straight or branched alkyl of 1 to 20 carbon atoms, unsaturated straight or branched alkenyl of 2 to 10 carbon atoms, unsaturated straight or branched alkynyl of 2 to 10 carbon atoms, C$_3$–C$_8$ cycloalkyl, aryl and heterocyclyl; in which, for each instance of I, each instance of X, Z, R$_1$ or R$_2$ may be the same or different.

3. The (co)polymer of claim 1 comprising at least one divalent polyether segment L from the group consisting of a poly(oxyethylene) and a poly(oxypropylene).

4. The (co)polymer of claim 1 in which each instance of R$_1$ and R$_2$ are the same or different and are independently selected from the group consisting of methyl and cyclohexyl.

5. The (co)polymer of claim 1 in which the initiator includes halo-isobutyryl groups.

6. The (co)polymer of claim 5 in which the initiator is di-(trimethylolpropane)-tetra-(2-bromoisobutyrate).

7. The (co)polymer of claim 1 in which the controlled radical (co)polymerization process is an atom transfer radical polymerization process.

8. The (co)polymer of claim 1 having the general formula:

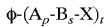

in which
   a) A and B are different ethylenically unsaturated monomers;

b) p is an integer from 1 to 300;
c) s is an integer from 0 to 300;
d) t is an integer greater than 1
e) X is a halide; and
f) φ is a residue from the initiator and has the general structure:

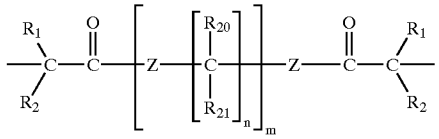

in which:
i) n is an integer greater than 1;
ii) m is an integer greater than 1;
iii) Z is oxygen or sulfur;
iv) $R_1$ and $R_2$ are independently the same or different and are selected from the group consisting of hydrogen, straight or branched alkyl of 1 to 20 carbon atoms, unsaturated straight or branched alkenyl of 2 to 10 carbon atoms, unsaturated straight or branched alkynyl of 2 to 10 carbon atoms, $C_3$–$C_8$ cycloalkyl, aryl and heterocyclyl;
v) $R_{20}$ and $R_{21}$ are independently the same or different and are selected from the group consisting of hydrogen, straight or branched alkyl of 1 to 20 carbon atoms, unsaturated straight or branched alkenyl of 2 to 10 carbon atoms, unsaturated straight or branched alkynyl of 2 to 10 carbon atoms, $C_3$–$C_8$ cycloalkyl, aryl, heterocyclyl and a structure according to the formula:

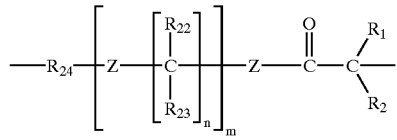

in which n, m, Z, $R_1$ and $R_2$ are defined as above; $R_{22}$ and $R_{23}$ are independently the same or different and are selected from the group consisting of hydrogen, straight or branched alkyl of 1 to 20 carbon atoms, unsaturated straight or branched alkenyl of 2 to 10 carbon atoms, unsaturated straight or branched alkynyl of 2 to 10 carbon atoms, $C_3$–$C_8$ cycloalkyl, aryl and heterocyclyl; and $R_{24}$ is straight or branched alkyl of 1 to 20 carbon atoms.

9. The (co)polymer of claim 8 in which φ is a residue having the formula:

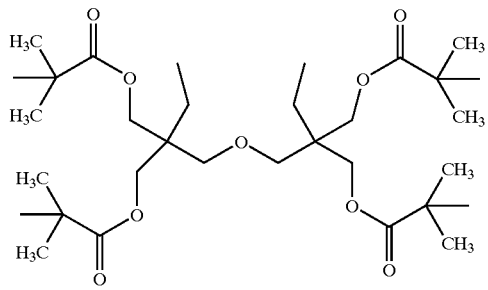

10. An article prepared from a resinous composition comprising the (co)polymer of claim 1.

11. A method for preparing a (co)polymer comprising the step of (co)polymerizing ethylenically unsaturated monomers in the presence of an initiator under controlled radical polymerization conditions, the initiator having the structure R—[L—I]$_n$: in which,
a) n is an integer greater than 1;
b) R is an organic n-valent linking group containing at least one linkage selected from the group consisting of ether and sulfide;
c) L is optionally present for each instance of I and is a divalent polyether segment, each instance of which may be the same or different; and
d) I is a group having the structure:

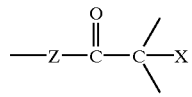

in which X is a halide and Z is oxygen or sulfur.

12. The (co)polymer of claim 11 in which the structure of I is further defined as:

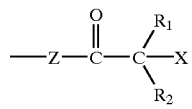

in which:
d) X is a halide;
e) Z is oxygen or sulfur; and
f) $R_1$ and $R_2$ are independently the same or different and are selected from the group consisting of hydrogen, straight or branched alkyl of 1 to 20 carbon atoms, unsaturated straight or branched alkenyl of 2 to 10 carbon atoms, unsaturated straight or branched alkynyl of 2 to 10 carbon atoms, $C_3$–$C_8$ cycloalkyl, aryl and heterocyclyl; in which, for each instance of I, each instance of X, $R_1$ or $R_2$ may be the same or different.

13. The method of claim 11 in which the controlled radical polymerization process is an atom transfer radical polymerization process.

14. The method of claim 11 in which the initiator is di-(trimethylolpropane)-tetra-(2-bromoisobutyrate).

15. A compound having the structure:

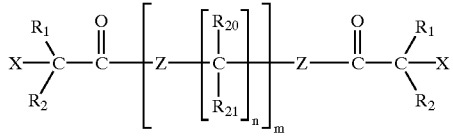

in which:
a) n is an integer greater than 1;
b) m is an integer greater than 1;
c) X is one of a halide group and an organic group;
d) Z is one of oxygen and sulfur; and
e) $R_1$ and $R_2$ are independently the same or different and are selected from the group consisting of hydrogen, straight or branched alkyl of 1 to 20 carbon atoms, unsaturated straight or branched alkenyl of 2 to 10 carbon atoms, unsaturated straight or branched alkynyl of 2 to 10 carbon atoms, $C_3$–$C_8$ cycloalkyl, aryl and heterocyclyl;
f) $R_{20}$ and $R_{21}$ are independently the same or different and are selected from the group consisting of hydrogen, straight or branched alkyl of 1 to 20 carbon atoms, unsaturated straight or branched alkenyl of 2 to 10 carbon atoms, unsaturated straight or branched alkynyl of 2 to 10 carbon atoms $C_3$–$C_8$ cycloalkyl, aryl, heterocyclyl and a structure according to the formula:

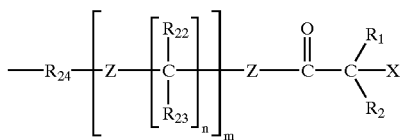

in which n, m, X, Z, $R_1$ and $R_2$ are defined as above; $R_{22}$ and $R_{23}$ are independently the same or different and are selected from the group consisting of hydrogen, straight or branched alkyl of 1 to 20 carbon atoms, unsaturated straight or branched alkenyl of 2 to 10 carbon atoms, unsaturated straight or branched alkynyl of 2 to 10 carbon atoms, $C_3$–$C_8$ cycloalkyl, aryl and heterocyclyl; and $R_{24}$ is straight or branched alkyl of 1 to 20 carbon atoms.

16. The compound of claim 15 in which each instance of $R_1$ and $R_2$ are the same or different and are independently selected from the group consisting of methyl and cyclohexyl.

17. The compound of claim 15 in which each instance of n is from 2 to 6 and m is from 2 to 200.

18. The compound of claim 15 in which $R_1$ and $R_2$ are methyl.

19. A compound comprising di-(trimethylolpropane)-tetra-(2-bromoisobutyrate).

* * * * *